United States Patent [19]
Edwards et al.

[11] Patent Number: 5,140,663
[45] Date of Patent: Aug. 18, 1992

[54] LATCHING BEAM MECHANISM HAVING PLUG STOPS FOR OPTICAL CONNECTOR

[75] Inventors: Bryan T. Edwards, Camp Hill; Steven L. Flickinger, Hummelstown; James D. Kevern, Wellsville; David D. Sonner, Harrisburg; Robert N. Weber, Hummelstown; Jeffrey A. Zeiders, Middletown, all of Pa.

[73] Assignee: AMP Incorporated, Harrisburg, Pa.

[21] Appl. No.: 720,122

[22] Filed: Jun. 24, 1991

Related U.S. Application Data

[63] Continuation-in-part of Ser. No. 686,896, Apr. 17, 1991.

[51] Int. Cl.$^5$ .................................................. G02B 6/26
[52] U.S. Cl. ........................................ 385/90; 385/78; 385/89; 385/92; 385/139
[58] Field of Search ................... 385/78, 81, 84, 88, 385/89, 90, 92, 139, 52; 250/227.11

[56] References Cited

U.S. PATENT DOCUMENTS

| | | | |
|---|---|---|---|
| 3,960,429 | 6/1976 | Moulin | 439/551 X |
| 4,167,303 | 9/1979 | Bowen et al. | 385/59 |
| 4,291,943 | 9/1981 | Binek et al. | 385/89 |
| 4,611,887 | 9/1986 | Glover et al. | 385/71 |
| 4,645,295 | 2/1987 | Pronovost | 385/55 |
| 4,715,675 | 12/1987 | Kevern et al. | 385/80 |
| 4,736,100 | 4/1988 | Vastagh | 250/227.11 |
| 4,759,599 | 7/1988 | Yamaguchi et al. | 385/60 |
| 4,762,388 | 8/1988 | Tanaka et al. | 385/58 |
| 4,787,706 | 11/1988 | Cannon, Jr. et al. | 385/24 |
| 4,840,451 | 6/1989 | Sampson et al. | 385/89 |
| 4,872,736 | 10/1989 | Myers et al. | 385/60 |
| 4,960,317 | 10/1990 | Briggs et al. | 385/56 |
| 4,979,792 | 12/1990 | Weber et al. | 385/53 |
| 5,005,939 | 4/1991 | Arvanitakis et al. | 385/53 |
| 5,016,968 | 5/1991 | Hammond et al. | 385/78 |

OTHER PUBLICATIONS

Optimate Catalog 88-812, AMP Incorporated, Mar. 1989, pp. 5-18.

*Primary Examiner*—Brian Healy
*Attorney, Agent, or Firm*—Gerald K. Kita

[57] ABSTRACT

A connector for joining light transmitting fiber cables through a cover (14) to a transmitter and/or receiver device (3) comprises a plug half connector (6) comprising a plug (8) and a transceiver adapter (10). The plug (8) has profiled passageway (43) for receiving an optical fiber. The transceiver adapter (10) is an integral two-part structure comprising a transceiver shroud (11) adapted to axially receive the plug (8) and extending axially (38) for aligning the plug (8) forward relative to the transmitter and/or receiver device (3). The adapter (10) further comprises a latching beam mechanism (12) having forward extending latching beams (13), the latching beam mechanism (12) characterized by a wedge shaped plug stop (64) along each of the extending latching beams (13).

12 Claims, 6 Drawing Sheets

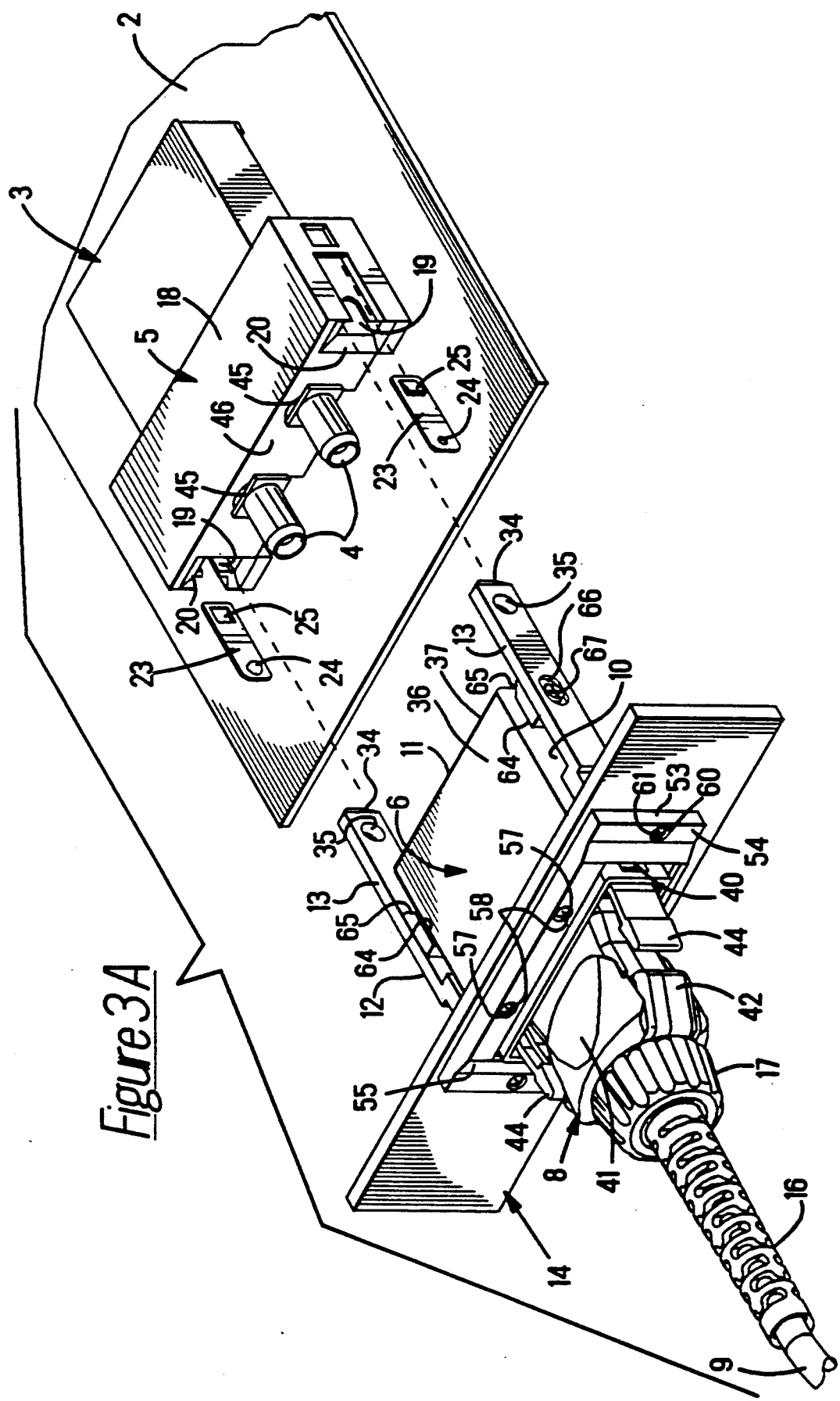

LATCHING BEAM MECHANISM HAVING PLUG STOPS FOR OPTICAL CONNECTOR

This application is a continuation-in-part of Edwards et al. co-pending U.S. application Ser. No. 07/686,896 filed Apr. 17, 1991, Edwards II, pending.

FIELD OF THE INVENTION

The present invention relates to an optical fiber connector with an self-centering feature for positioning, aligning, and guiding mating electrical or optical connector halves.

BACKGROUND OF THE INVENTION

It is standard practice with respect to mating connectors to provide means which position the connector halves so that the terminals therein are aligned for a proper mating engagement. It is common to provide pins, posts, and projections in one half made to fit within complementary apertures in the other half; both integrally molded with respect to the housings of the connector halves, or added as hardware. One problem associated with interconnecting of connector halves arises when the halves are of different suppliers and are not complementary. In such instances it is necessary to provide an adapter that alters one or both of the connector halves so as to permit interconnection. A particular instance of such problem involves the replacement, within a computer bulkhead, of a circuit board-mounted transceiver of one manufacturer with a circuit board-mounted transceiver of another manufacturer. In such instance the replacement board may be characterized by receiver and transmitter ports of alignment differing from the alignment of the ports of the transceiver board which has been replaced. Precise connection between the transceiver ports with a connector through the backplane of the computer bulkhead may be impossible if, indeed, connection may be made at all.

Edwards I addresses the problem of the differing fit of circuit boards, and generally the problem of precise fit between connector halves by providing a connector half with a latching beam mechanism feature for positioning, aligning and guiding mating connector halves and for providing improved retention between the resulting, mated halves.

The Edwards I connector joins light transmitter fiber cables through a cover to a transmitter and/or receiving device. The connector comprises a plug connector half and a clip connector half. The plug connector half comprises a plug having an axially extending bore for receiving an optical fiber, and a transceiver adapter adapted to axially receive the plug through the cover. The transceiver adapter is a two-part structure comprising a transceiver shroud and a latching beam mechanism. The shroud is adapted to axially receive the plug and extends axially forward for aligning the plug relative to the transmitter and/or receiver device. The latching beam mechanism is integral with the shroud and has forward extending latching beams.

The clip connector half of Edwards I is attached to and integral with the transmitter/receiver device and has apertures therein beveled to receive the latching beams. Each of the latching beams has a beveled forward end for interacting with the respective beveled aperture of the clip connector half to align the beam to the opening upon mating of the plug connector half to the clip connector half. Each of the latching beams has a port toward its forward end. The port is transverse to the longitudinal axis of the beam. The clip connector half further comprises a clip retention window coextensive to each aperture through a port common to both the retention window and the aperture. The clip connector half further comprises a clip with a dimple adapted to clip within each of the retention windows with the dimple biased through the port in the window and into engagement with the latching beam through the port of the beam upon mating of the plug connector half to the clip connector half.

Application Ser. No. 07/667,724 filed Mar. 11, 1991, pending, relates to a connector for joining light transmitting fiber cables through a cover to a transmitter and/or receiver device wherein the connector is characterized by a floating alignment feature that permits realignment of the plug connector half so as to accommodate a misaligned connector half during intermating. The float feature is provided by a retention frame mounted to the cover to captivate the transceiver adapter of the plug connector half with play of the adapter within the frame so as to permit free floating of the transceiver adapter relative to the cover within the retention frame.

With the connector of Edwards I, insertion of the beam into the aperture of the clip connector half must be limited within a specified tolerance. If the beam is inserted too far into the aperture the ferrules of the plug overcompress, causing light loss in the transfer between receiver and/or transmitter and respective optical fiber ends. Over insertion may also dislodge the dimples of the connector clip from within the seating port of the beam end. If the beam is not inserted to a sufficient depth within the aperture then light loss occurs between receiver and/or transmitter and respective optical fiber ends. Further, as with over insertion, the dimples of the connector clip may not be properly seated within the port of the beam end thereby adversely affecting the retention of the beam by the connector clip. The present invention addresses this problem of proper depth of insertion of a beam within a clip aperture by providing a stop as an improvement to the beam structure.

It is an object of the present invention to provide an improvement to the connectors of Edwards I and Edwards II. It is an object of the present invention to provide a connector with an alignment feature that permits interconnection between connector halves of a variety of types without requiring the providing of an adapter for each such interconnection. It is further an object to provide a stop means that prevents over insertion of latching beams into apertures of a clip connector half during intermating. It is particularly an object of the present invention to provide an improved connection between a board mounted transmitter and/or receiver and a shrouded plug connector, as for example, a connection between a Fiber Distributed Data Interface (FDDI) and a connector of the Fixed Shroud Duplex (FSD) type.

SUMMARY OF THE INVENTION

The present invention relates to a connector for joining light transmitting fiber cables through a cover to a transmitter and/or receiver device. The connector comprises a plug connector half and a clip connector half. The connector is characterized by a latching beam mechanism that provides both an improved aligning feature during intermating and improved retention while interconnected.

The latching beam mechanism of the present invention is characterized by a wedge shaped plug stop along each extending latching beam. The clip connector half, attached to and integral with the transmitter/ receiver device, has apertures therein beveled to receive a respective latching beam. Each aperture has a stop opposed to the beam plug stop, and the stop is characterized by a wedge having a face complementary to a face of the beam stop.

The wedge shaped beam plug stop may be separate from the latching beam and may be adjustable along the longitudinal axis of the latching beam. In this instance, each latching beam of the latching beam mechanism is a beam shaped body with a forward beveled face and a seat accommodating an adjustable retention screw threaded to the plug stop. The seat comprises a slot that permits displacement of the screw along the longitudinal axis of the latching beam. The retention screw may be tightened to maintain the beam plug stop at a position or may be loosened to permit the beam plug stop to be adjusted along the longitudinal axis of the beam.

The transmitter and/or receiver device may have mounts projecting therefrom for connecting each transmitter and/or receiver to a respective optical fiber cable which extends forward within the axial bore of the plug. Each mount has a square base which forms flanges. The clip connector half further comprises a face with arc-shaped openings for clip fit to the flanges of the mounts of the transmission and/or receiver device.

BRIEF DESCRIPTION OF THE DRAWINGS

FIG. 3A is a perspective view showing connector halves preparatory to mating, along with associated mounting structures.

DESCRIPTION OF A PREFERRED EMBODIMENT

Figure 1:
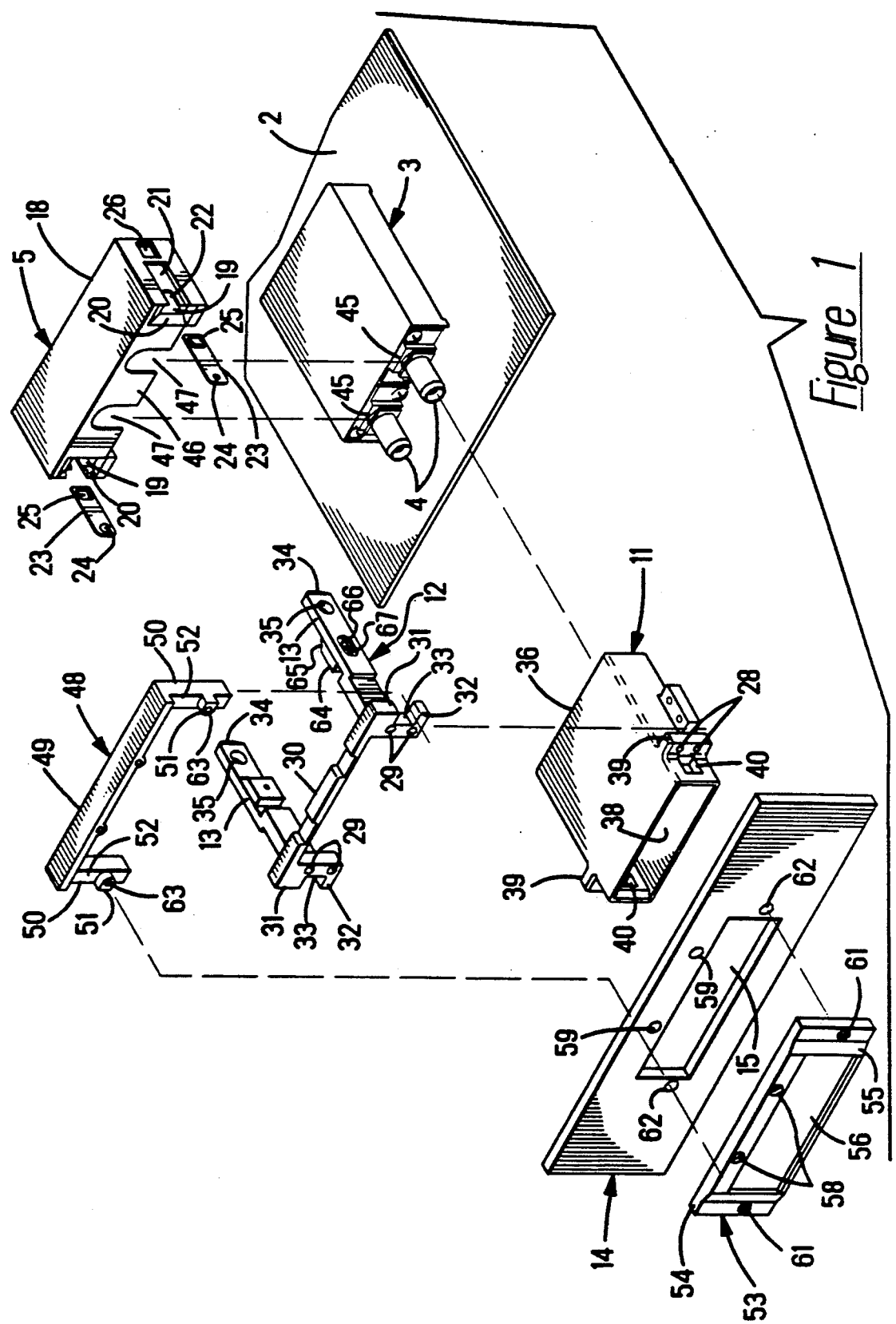
FIG. 1 is a perspective view, partially exploded, of the present invention along with a cover and transmitter and/or receiver device.

Referring to FIGS. 1, 2, 3A, 4A and 7, an electronic package 1 is shown to include a mounting structure 2 which may be a printed circuit board carrying circuit traces to electronic components such as logic and memory devices. Mounted on structure 2 is a transmitter/receiver device 3 which includes a pair of signal ports 4 suitably interconnected to components which convert electrical to optical and optical to electrical signals, i.e. transmitters and receivers. Shown also, is clip connector 5 which is a connector half, and which with half structure 6 comprises the connector 7 of the present invention as hereinafter described.

Half structure 6 includes plug 8 terminating a cable 9 to a forward portion, and transceiver adapter 10. Transceiver adapter 10 is shown as a two part structure comprising a transceiver shroud 11 and latching beam mechanism 12. Transceiver shroud 11 is adapted to axially receive plug 8. The shroud 11 extends axially for aligning the plug relative to the transmitter/receiver device 3. The latching beam mechanism 12 has latching beams 13 extending therefrom. The connector half 6 is mounted, as indicated, in a mounting structure which may be considered, in the embodiment here involved, as a panel front or cover 14 which encloses the interconnection when the connector halves 5, 6 are mated through window 15 of the panel front 14.

Figure 4A:
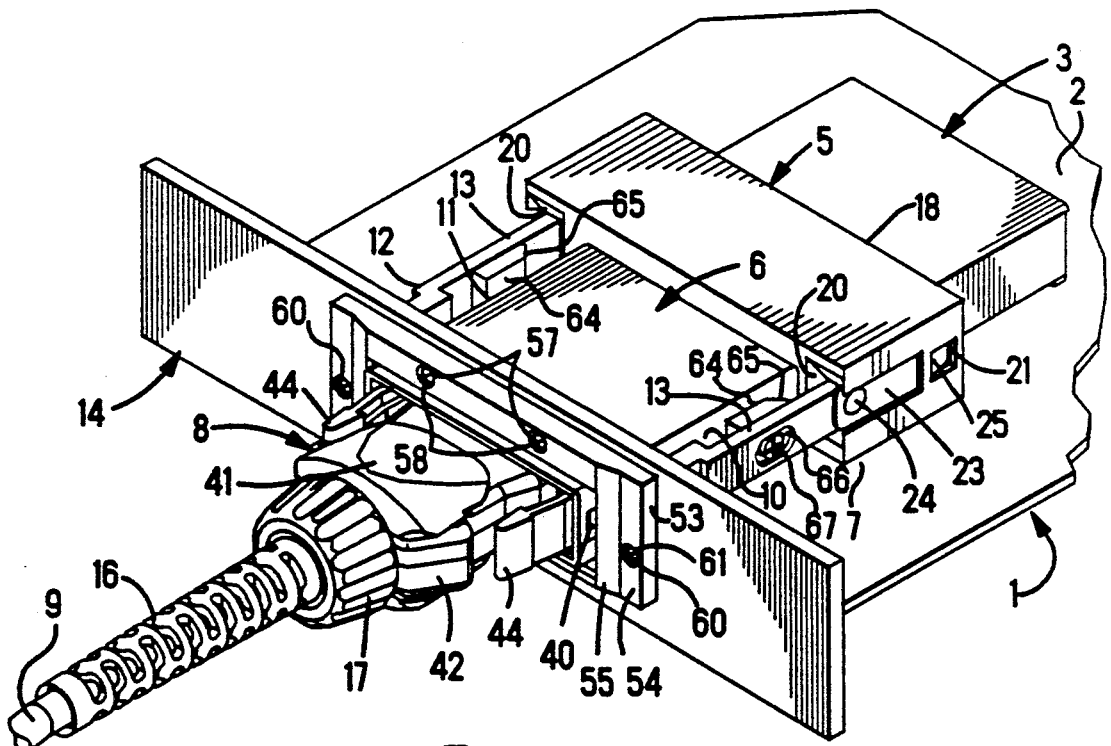
FIG 4A is a perspective view showing mated connector halves along with associated mounting structures.
Figure 4B:
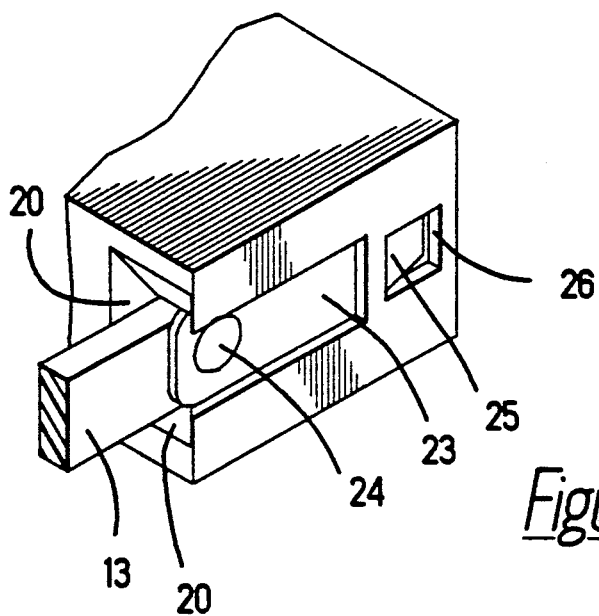
FIG. 4B is a perspective view of a connected latching beam and aperture.

In FIGS. 3A and 4A, the plug connector half 6 further comprises strain relief means 16 which is a tubular member with integral means for distributing bending substantially along its length. The plug 8 has a threaded end (not shown). Cap 17 has a threaded bore complementary to the end of the plug 8, and has a bore of decreased opening for capturing the strain relief 16 when the cap 17 is inter-engaged with the threaded end of the plug 8.

Shown in FIGS. 1, 2, 3A, 3B, 4A, 4B and 7, clip connector half 5 comprises a cover body 18 having apertures 19 which are beveled 20 to receive latching beams 13 which, upon connection, are guided into the apertures 19 by the beveling 20. Clip connector half 5 further comprises clip retention slot 21 coextensive with each of apertures 19 through cut-out 22 common to both the retention slot 21 and the aperture 19, and further comprises clips 23 each with dimple 24. Each clip 23 has wing 25 which is a portion of the clip 23 biased upward to form the said wing 25 with function as hereinafter described. The clips 23 are adapted to fit within respective retention slot 21 with dimple 24 biased through respective cut-out 22 in the slot 21 and wing 25 providing retention by snap fit within a window 26 which is a continuation of slot 21 beneath the cover body 18 of the connector half 5.

Figure 2:
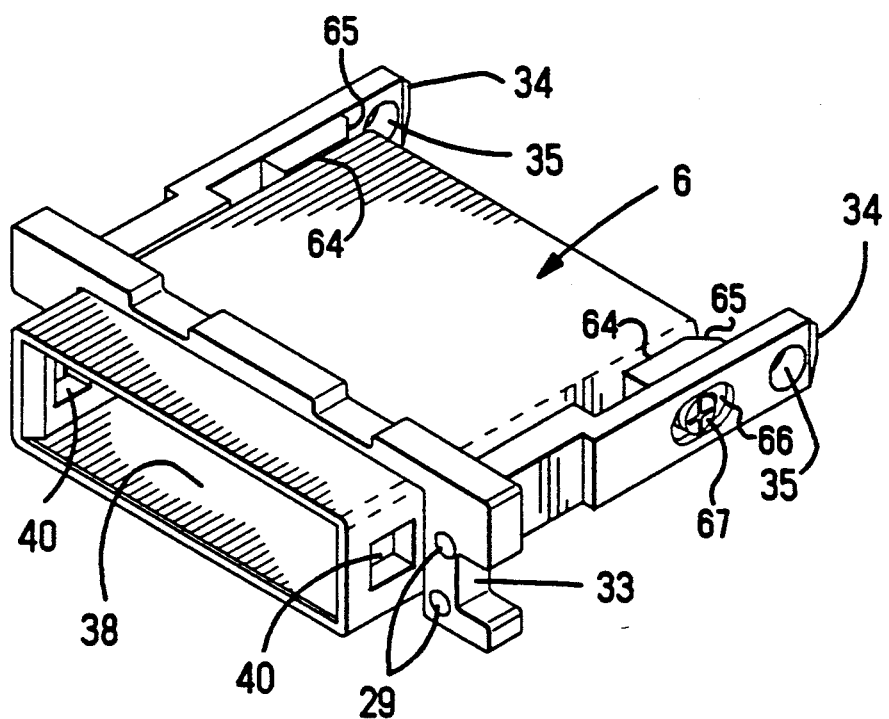
FIG. 2 is a perspective view of a molded single piece transceiver adapter, one of the embodiments of the present invention.
Figure 3B:
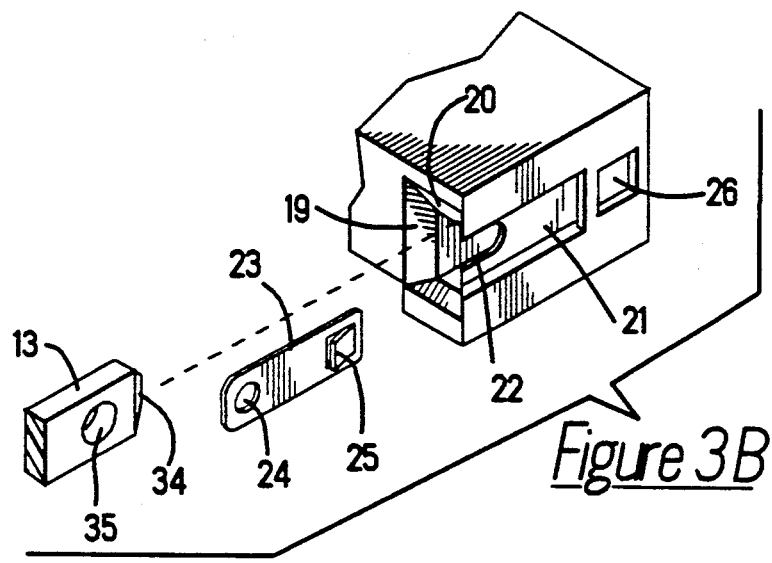
FIG. 3B is an exploded perspective view of the connection between a latching beam and aperture showing the clip retention window and clip.

The transceiver adapter 10 may be a molded integral structure as shown in FIG. 2 characterized by a transceiver shroud portion 11 and latching beam mechanism portion 12 or the adapter 10 may be a two part structure, as shown in the FIGS. 1, 3A and 4A, comprising a transceiver shroud part 11 and a latching beam mechanism 12 secured together with an interengaging means to form said integral two part structure—the transceiver adapter 10. The inter-engaging means may be bolts 27 through the commonly aligned holes 28 of the transceiver shroud 11 and holes 29 of the latching beam mechanism 12. Notable is that the transceiver adapter 10 is located within the cover 14 and receives the plug 8 through window 15 to within the cover 14 enclosure. By fixing the location of the adapter 14 within the enclosure, the position of the transceiver 3 is set. If the adapter 10 were positioned outside of the enclosure then location of the transceiver 3 would be dependant upon the thickness of the cover 14. Changing between different covers 14 of different thicknesses would otherwise require relocation of the mounting of the transceiver 3 and clip connector half 5 within the enclosure. This problem is eliminated with the positioning of the adapter 10 in accord with the present invention.

Referring to FIGS. 1, 3A, 4A, 5, 6 and 7, latching beam mechanism 12 is in the form of a main body 30 having latching beams 13 extending therefrom and side extending flanges, both upper 31 and lower 32, which define a gap 33 with utility as hereinafter described. Each latching beam 13 is a beam shaped body with forward beveled face 34 and port 35. When interconnected to form transceiver adapter 10, the main body 30 of the latching beam mechanism 12 straddles shroud 11 with inter-engaging holes 28 aligned with holes 29 of the shroud 11 as aforesaid.

Transceiver shroud 11 consists of a body 36 having forward mating face 37, axial cavity 38 to receive the plug 8, extending flanges 39 with holes 29 and latch ports 40 to both sides of body 36.

Figure 7:
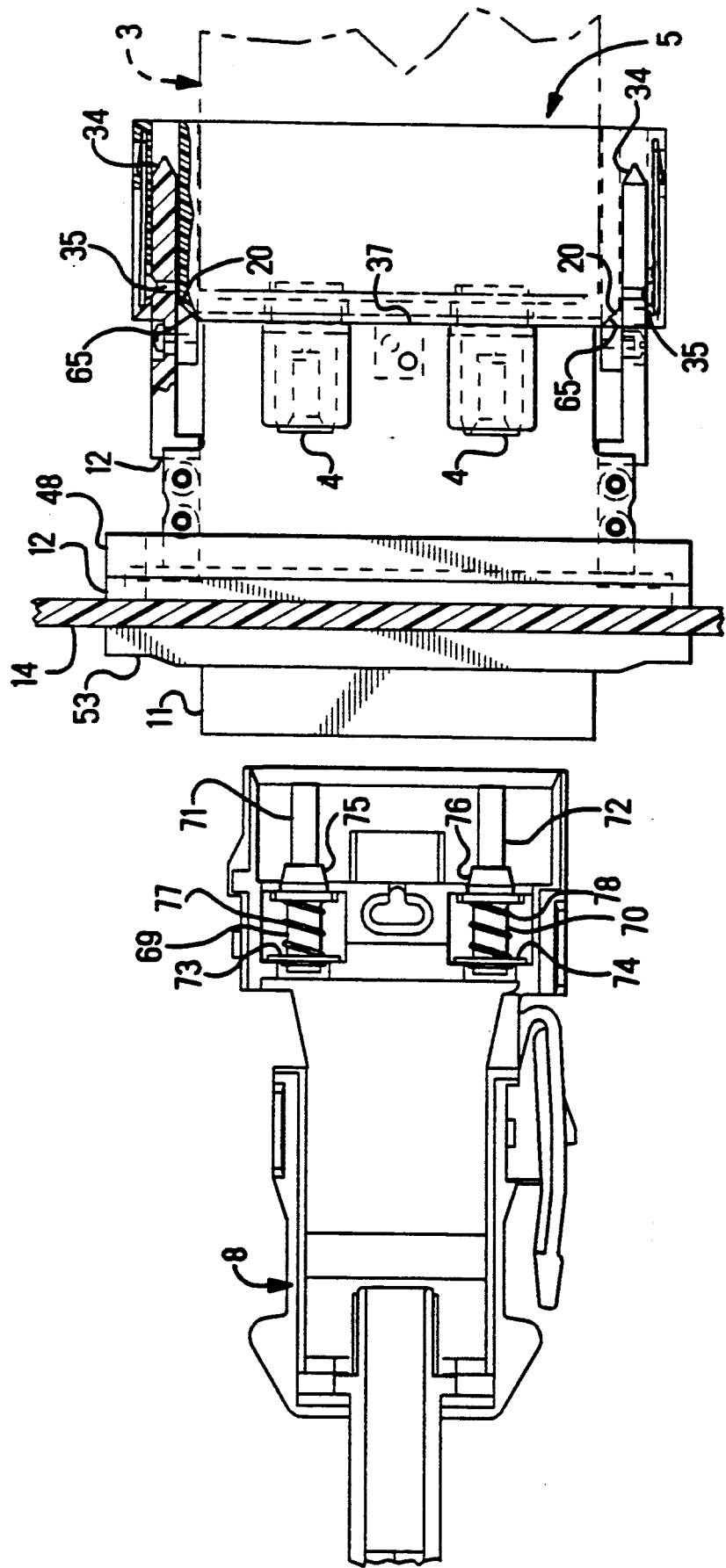
FIG. 7 is a cut away top view of connector halves showing latching beams interconnected within respective apertures.

Plug 8 is constructed for disconnect coupling through means of transceiver adapter 10 and is a hollow body of molded upper cover 41 and molded lower cover 42. The covers 41, 42 are of insulated plastic material formed by molding into a shape that has an exterior with dimensions that intermate with the transmitter/receiver via transceiver adapter 10. Upper cover 41 and lower cover 42 are complementarily contoured in their interiors so as to form a profiled passageway 43 having optical cables disposed therein. Upper cover 41 intermates with lower cover 42 by snap-in connection. Threaded cap 17 secures the upper cover 41 together with the lower cover 42 to encompass and provide an enclosure for the optical fibers of optical cable 9. Within plug 8, as shown in FIG. 7, are fiber connectors 69 and 70 with alignment ferrules 71 and 72. Rear flanges 73 and 74 and truncated cone-shaped lead-in sections 75 and 76 are formed so as to nestle within complementary cavities formed by the closure of upper cover 41 and lower cover 42 with springs 77 and 78 biasing the lead-in sections 75 and 76 to form secure fit therewithin. The plug 8 is secured within the transceiver adapter 10 by biased fit of latches 44 through latch ports 40.

Further shown in FIGS. 1, 3A, 4A and 7, is transmitter/receiver device 3 and clip connector half 5. Transmitter/receiver ports 4 have square bases which form flanges 45. Clip connector half 5 is formed of cover body 18 having mating face 46 characterized by openings 47 which form lips that snap fit onto flanges 45.

With reference to FIGS. 1, 3A, 3B, 4A, 4B and 7, during connection of plug connector half 6 with clip connector half 5, the apertures 19 of clip connector half 5 receive respective latching beams 13 of plug connector half 6 with each bevel 20 interacting with the respective beveled face 34 of each latching beam 13 to guide each latching beam 13 into a respective receiving aperture 19. As the beam 13 progresses within aperture 19, beveled face 30 contacts dimple 24 of clip 23. Beveled face 34 imposes against dimple 24, which is biased into aperture 19 through port 22. Beveled face 34 pushes dimple 24 against the bias and to without the port 22 permitting beam 13 to progress up aperture 19. Dimple 24 snaps back into aperture 19 and into seat within port 35 of the latching beam 13, as port 35 becomes aligned with the port 22. The snap fit of the dimple 24 into port 35 retains the beam 13 within the aperture 19 of the clip half 5 with a predetermined retention force. Simultaneously, transceiver/receiver device 3 passes into axial cavity 38 of transceiver shroud 11 thereby connecting the transmitter and/or receiver 3 to a respective optical fiber disposed within the transceiver shroud 11.

Figure 5:
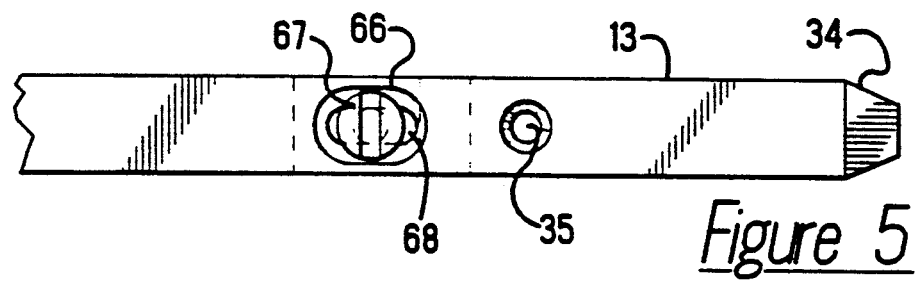
FIG. 5 is a side elevation view of a portion of the latching beam showing the wedge shaped plug stop of present invention.
Figure 6:
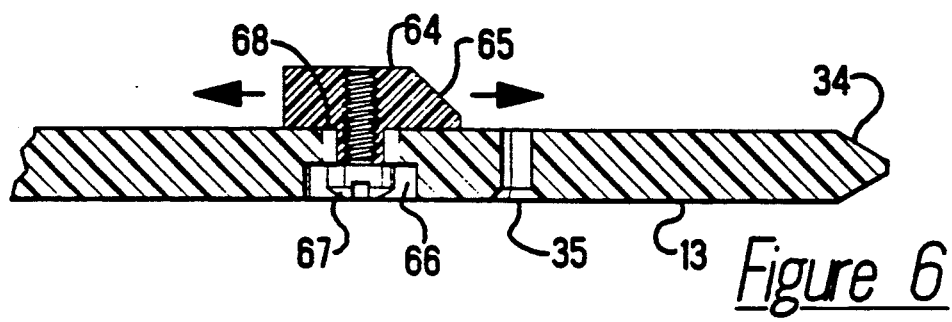
FIG. 6 is a cut away top view of the latching beam of FIG. 5.

As particularly shown in FIGS. 5 and 6, the latching beam mechanism 12 is characterized by a wedge shaped plug stop 64 along each extending latching beam 13. The wedge shaped beam plug stop 64 is a separate piece from the latching beam 13 and each stop 64 has a forward beveled face 65. Each aperture 19 of the clip connector half 5 has beveled face 20 which operates as a stop with a face complementary to face 67 of stop 64. The latching beam 13 has a seat 66 accommodating an adjustable retention screw 67 threaded to the plug stop 64. The seat 66 includes a slot 68 that permits displacement of the screw 67 along the longitudinal axis of the latching beam 13. The retention screw 67 may be tightened to maintain the beam plug stop 64 at a position or may be loosened to permit the beam plug stop 64 to be adjusted along the longitudinal axis of the beam 13 as hereinafter described. To adjust the plug stop 64 for proper insertion of the beam into the aperture 19, the retention screw 67 is loosened to permit the stop 64 to slip along slot 68. As described, the clip connector half 6 is connected to plug connector half 5 by insertion of latching beams 13 into respective aperture 19. Proper depth of insertion of each beam 13 into the aperture 19 and proper mating of the ferrules 71 and 73 of plug 8 to respective signal port 4 is visually determined and the screws 67 are tightened to secure each plug stop 64 at the determined position along each respective beam 13.

While what has been described constitutes a presently preferred embodiment of the invention, it should be recognized that the connector 7 of the present invention may take other forms so long as it is characterized by a transceiver adapter 10 which is a two-part structure comprising a transceiver shroud 11 and, integral therewith, a latching beam mechanism 12 having forward extending latching beams 13 each characterized by a wedge shaped plug stop 64. Accordingly, it should be understood that the invention is to be limited only insofar as required by the scope of the following claims.

We claim:

1. A connector for joining light transmitting fiber cables through a cover to a transmitter and/or receiver device comprising:
    a plug connector half comprising; a plug having axial extending bore for receiving an optical fiber, and a transceiver adapter which is a two part structure comprising; a transceiver shroud adapted to axially receive said plug and extending axially forward for aligning said plug relative to said transmitter and-/or receiver device, and, integral therewith, a latching beam mechanism having forward extending latching beams;
    said latching beam mechanism characterized by a plug stop along each of said extending latching beams.

2. The connector of claim 1 further comprising clip connector half attached to and integral with said transmitter/receiver device and having apertures therein beveled to receive a respective latching beam, and each said aperture having stop opposed to said beam plug stop, and having a face complementary to said beam stop.

3. The connector of claim 2 wherein said beam plug stop is separate from said latching beam and is adjustable along the longitudinal axis of said latching beam.

4. The connector of claim 3 wherein said each latching beam of said latching beam mechanism is a beam shaped body with forward face and seat accommodating an adjustable retention screw threaded to said beam plug stop, and seat comprising a slot permitting displacement of said screw along the longitudinal axis of said latching beam, and wherein said retention screw may be tightened to maintain the said beam plug stop at a position or may be loosened to permit said beam plug stop to be adjusted along said longitudinal axis of said latching beam.

5. The connector of claim 2 or claim 4, wherein said latching beam mechanism comprises a main body straddling said shroud and secured thereto and having latching beams extending therefrom.

6. The connector of claim 5 wherein each of said latching beams has beveled forward end shaped for interacting with a beveled aperture of said clip half connector to align said beams to said opening upon mating of said plug half connector to said clip half connector.

7. The connector of claim 6 wherein each of said latching beams has a second port transverse through the longitudinal axis of said beam and located toward said forward end.

8. The connector of claim 7 wherein said clip connector half further comprises a clip retention slot coextensive to each of said apertures through a cut-out common to both said retention window and said aperture, and further comprises a clip with dimple adapted to clip within said retention slot with said dimple biased through said cut-out in said slot and into engagement with said latching beam through said port of said beam upon mating of said plug connector half to said clip connector half.

9. The connector of claim 5 for joining light transmitting fiber cables to a transmitter and/or receiver device said device having mounts each with square base forming flanges, the mounts projecting from said device for connecting each transmitter and/or receiver device to a respective optical fiber cable extending forward within the axial bore of said plug.

10. The connector of claim 9 wherein said clip connector half further comprises a face with arc-shaped openings for clip fit to said flanges of mounts of said transmission and/or receiver device.

11. The connector of claim 5 wherein said transceiver shroud and said latching beam mechanism are secured together with interengaging means to form said integral two part structure.

12. The connector of claim 5 wherein said transceiver shroud and said latching beam mechanism are molded integral structures characterized by a transceiver shroud portion and a latching beam mechanism portion.

* * * * *